United States Patent [19]

Vieux et al.

[11] Patent Number: 4,985,633

[45] Date of Patent: Jan. 15, 1991

[54] SCINTILLATOR WITH ALVEOLATE STRUCTURED SUBSTRATE

[75] Inventors: Gérard Vieux, Grenoble; Paul de Croot, St. Ismier, both of France

[73] Assignee: Thomson-CSF, Puteaux, France

[21] Appl. No.: 381,862

[22] Filed: Jul. 19, 1989

[30] Foreign Application Priority Data

Jul. 22, 1988 [FR] France ................................ 88 09938

[51] Int. Cl.$^5$ ................................................ G01T 1/20

[52] U.S. Cl. ................................ 250/486.1; 250/483.1

[58] Field of Search .................. 250/483.1, 486.1, 362, 250/367

[56] References Cited

U.S. PATENT DOCUMENTS

| | | | |
|---|---|---|---|
| 3,032,657 | 6/1959 | Meier et al. | 250/486.1 |
| 4,101,781 | 7/1978 | Neukermans et al. | 250/486.1 |
| 4,236,077 | 11/1980 | Sonoda et al. | 250/486.1 |
| 4,398,118 | 8/1983 | Galxes et al. | 250/213 R |
| 4,543,485 | 9/1985 | Ishii et al. | 250/483.1 |
| 4,803,366 | 2/1985 | Vieux et al. | 250/486.1 |
| 4,879,202 | 11/1989 | Hosoi et al. | 250/486.1 |

FOREIGN PATENT DOCUMENTS

| | | |
|---|---|---|
| 0215699 | 3/1987 | European Pat. Off. . |
| 1103951 | 11/1955 | France . |
| 2462020 | 2/1981 | France . |
| 2515423 | 4/1983 | France . |

*Primary Examiner*—Janice A. Howell
*Assistant Examiner*—Drew A. Dunn
*Attorney, Agent, or Firm*—Oblon, Spivak, McClelland, Maier & Neustadt

[57] ABSTRACT

An improved scintillator for an input screen of an X-ray image intensifier tube is disclosed which has a substrate on which there is deposited the scintillating material in the form of thin parallel needles. The face of the substrate having the scintillating materials has an alveolate surface state or has an alveolate structure. As a result of this structure there are thinner needles formed and the reduction in the diameter of the needles results in an improvement of the resolution of the device.

4 Claims, 1 Drawing Sheet

SCINTILLATOR WITH ALVEOLATE STRUCTURED SUBSTRATE

BACKGROUND OF THE INVENTION

1. Field of the Invention

The invention concerns a method for the fabrication of a scintillator, more particularly designed for the input screen of an X-ray image intensifier tube.

It also concerns a scintillator obtained by the application of a method such as this.

2. Description of the Prior Art

X-ray image intensifier tubes are well-known in the prior art. They are used to convert an X-ray image, representing the absorption of X-rays by the structure to be depicted, into a visible image. Devices such as this are widely used for medical observation. An image intensifier tube is formed by an input screen, an electron optical system and an observation screen. The input screen has a scintillator which converts the X-rays into visible photons. These visible photons then strike a photocathode, generally formed by an alkaline antimonide. This antimonide, thus excited, generates a flow of electrons. This flow is then transmitted by the electron optical system which focuses the electrons and directs them to an observation screen, formed by a luminograph, which then emits a visible light reconstituting the X-ray image. This light can then be processed, for example, by a television, cinema or photographicsystem.

The scintillator of the input screen is generally formed by cesium iodide deposited by vacuum evaporation on a substrate. The substrate is generally formed by a aluminium cap with a spherical or hyperbolic profile. The thickness of the cesium iodide deposited generally ranges from 150 to 500 microns. The cesium iodide is deposited in the form of needles with a diameter of 5 to 10 microns. Since the refractive index of cesium iodide is 1.8, the advantage of a certain fiber optic effect is obtained. This effect minimizes the lateral diffusion of light within the scintillating material. A scintillator of this type is, for example, described in the French patent application No. 85.12.688 dated 23rd August 1985.

The resolution of the tube depends on the capacity of the cesium iodide needles to properly channel the light. It is therefore useful to reduce their diameter. It also depends on the thickness of the cesium iodide layer. An increase in this thickness harms the resolution. On the contrary, the greater the thickness of cesium iodide, the more X-rays are absorbed. Hence, a compromise has to be found between the absorption of X-rays and resolution. To this effect, the invention proposes an improvement enabling a reduction in the mean diameter of the cesium iodide needles.

SUMMARY OF THE INVENTION

To this end, the invention therefore concerns a method for the fabrication of a scintillator consisting in the growing of needles of scintillating material, such as, for example, cesium iodide, on a substrate wherein, prior to a stage of growth of said needles, an alveolate structure or surface state is created on the surface of said substrate, and then said needles are grown on this alveolate structure or surface state.

It may be supposed that the subsequent vacuum evaporation of cesium iodide is started on the large number of rough features that are created by the surface state obtained and that, thus, finer needles can grow in increasingly great number on one and the same surface of the substrate.

One approach to obtaining this alveolate surface state or alveolate structure consists in producing the oxidation of the substrate surface under conditions such that the oxide layer formed has an alveolate structure of this type. This method is particularly appropriate with an aluminium substrate which is most commonly used as a support of a scintillating layer. The alumina produced may have an alveolate structure if the oxidation takes place in a chemical medium which has the property of, at the same time, dissolving said oxide. This is notably so if a face of the substrate is subjected to an electrochemical anodization treatment where the anodization bath contains an acid or any other product with a property of chemically dissolving the oxide. The alveolate structure is the result of two actions, that is firstly, the electrochemical formation of the oxide layer and, secondly, its own dissolving, which is purely chemical, in the anodization bath. For alumina, there could be provision for an anodization bath containing phosphoric acid or sulphuric acid.

However, the invention concerns any process, the consequence of which is the production of an alveolate layer on the surface of the substrate. Thus, vacuum evaporation of any element with re-deposition on the substrate may give rise to an alveolate deposit if this operation is done deliberately with a limited vacuum, notably between 1 and 0.01 torr.

The invention also concerns any scintillator having a substrate on which the scintillating material is deposited in the form of substantially parallel, fine needles, wherein the face of said substrate which bears said scintillating material has an alveolate surface state or has an alveolate structure.

BRIEF DESCRIPTION OF THE DRAWINGS

The invention will be better understood and other of its advantages will appear more clearly from the following description, given purely as an example, and made with reference to the appended drawings, of which.

DESCRIPTION OF A PREFERRED EMBODIMENT

Figure 1:
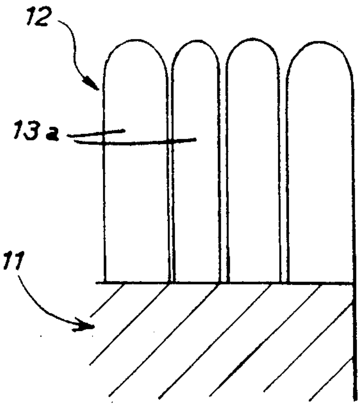
FIG. 1 PRIOR ART
FIG. 1 gives a schematic sectional view of a part of a prior art scintillator.

Referring to FIG. 1, the prior art scintillator consists essentially of an aluminium substrate 11 on which a layer of scintillating material 12 is made to grow. This layer 12 consists of the juxtaposition of needles 13*a* placed side by side, substantially parallel with one another, rising in a direction approximately perpendicular to the surface of the substrate. Herein, the scintillating material is cesium iodide. In a standard way, these needles are the result of a process of vacuum evaporation of cesium iodide followed by its re-deposition on the substrate. In the prior art represented, the aluminium substrate has undergone simple cleaning in an acid or alkaline medium. With the surface condition resulting from this cleaning process, the needles develop with a mean diameter of 5 to 10 microns.

Figure 2:
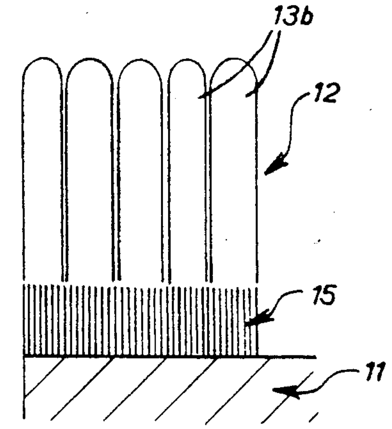
FIG. 2 gives a schematic view, using the same scale as FIG. 1, of a part of a scintillator according to the invention.

With the invention, as shown schematically in FIG. 2, we again have the substrate 11 and layer 12 of the scintillating material, but the latter consists of needles **13*b* which are appreciably thinner than in the prior art. This advantageous result is attributed to the fact that these needles, formed in the same way as above (evaporation and re-deposition under vacuum of cesium iodide) have developed on a layer of an alveolate structure 15**. In this case, this layer is made of alumina resulting from a surface oxidation of the substrate itself. This oxidation is achieved according to a particular process which shall be described further below.

Figure 3:
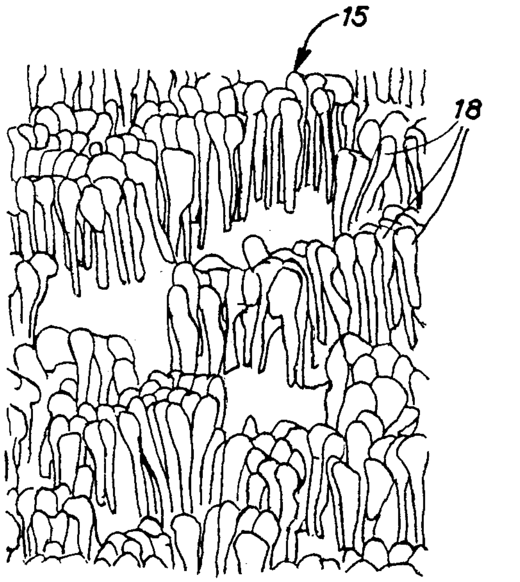
FIG. 3 is a highly enlarged view of the alveolate structure of the scintillator according to the invention.

FIG. 3 shows that this alveolate structure 15 is characterized, in the example described, by the presence of small columns 18 shaped like matchsticks, the diameter of which is between 500 and 5000 angstroms. As mentioned above, this result is obtained by forming the oxide layer (alumina herein) in a medium having the property of chemically dissolving the oxide. The alumina layer is thus partially destroyed as and when it gets formed. This results in the structure of FIG. 3. It is on this alveolate structure that the layer of scintillating material is subsequently made to grow. The consequence of this is the formation of thinner needles.

Figure 4:
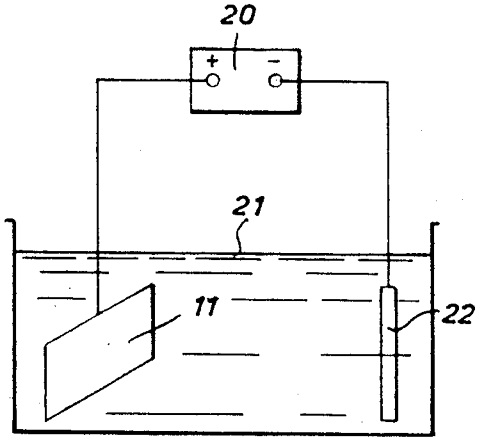
FIG. 4 is a schematic illustration of a piece of equipment enabling the application of the essentially novel stage of the method for the fabrication of a scintillator such as this.

The treatment used to obtain the alveolate structure is shown in FIG. 4. The substrate 11 (one face of which is temporarily protected by a varnish) is connected to the positive pole of a current source 20 and thus forms an electrode of an electrochemical anodization system. In other words, this electrode-forming substrate is plunged into an electrochemical solution 21 capable of generating the formation of an alumina layer. The negative pole of the current source 20 is connected to another electrode 22 plunging into this same solution. The latter contains a chemical product attacking the oxide as and when it is formed. In the case of alumina, this product may be phosphoric acid or sulphuric acid.

At the end of the anodization process, the substrate is placed in a chamber wherein a vacuum is made. Then, the cesium iodide is evaporated in said chamber according to a known process, thus resulting in the formation of the needles **13*b*** shown in FIG. 2.

It is clear that the invention covers many variants. In particular, it must be noted that it is the alveolate surface state, on which the scintillating material is made to grow, that is important for the application of the invention and not the chemical composition of the alveolate layer.

What is claimed:

1. A scintillator comprising a substrate on which there is deposited a scintillating material in the form of thin, appreciably parallel needles, wherein the face of said substrate having said scintillating material has an alveolate surface state or comprises an alveolate structure.

2. A scintillator according to claim 1 wherein said substrate is made of metal and wherein said face of said substrate bearing said material has a layer of oxide of said metal, with said layer forming an alveolate structure.

3. A scintillator according to claim 2, wherein said substrate is made of aluminium and wherein its face bearing the said needles of scintillating material has a layer of alveolate alumina.

4. A scintillator according to claim 1, wherein said scintillating material is cesium iodide.

* * * * *